United States Patent
Qiao et al.

(10) Patent No.: US 11,593,129 B2
(45) Date of Patent: Feb. 28, 2023

(54) UNIFIED INTELLIGENT EDITOR TO CONSOLIDATE ACTIONS IN A WORKSPACE

(71) Applicant: CITRIX SYSTEMS, INC., Fort Lauderdale, FL (US)

(72) Inventors: Zongpeng Qiao, Nanjing (CN); Ze Chen, Nanjing (CN); Ke Xu, Nanjing (CN); Tao Zhan, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 72 days.

(21) Appl. No.: 17/304,563

(22) Filed: Jun. 23, 2021

(65) Prior Publication Data
US 2022/0137990 A1 May 5, 2022

Related U.S. Application Data

(63) Continuation of application No. 17/114,609, filed on Dec. 8, 2020, now Pat. No. 11,048,531, which is a continuation of application No. PCT/CN2020/126335, filed on Nov. 4, 2020.

(51) Int. Cl.
| | |
|---|---|
| G06F 9/451 | (2018.01) |
| G06F 16/33 | (2019.01) |
| G06F 40/186 | (2020.01) |
| H04L 67/568 | (2022.01) |

(52) U.S. Cl.
CPC .......... *G06F 9/451* (2018.02); *G06F 16/3344* (2019.01); *G06F 40/186* (2020.01); *H04L 67/568* (2022.05)

(58) Field of Classification Search
CPC .... G06F 9/451; G06F 16/3344; G06F 40/186; H04L 67/2842; H04L 67/568
USPC ........................................................ 715/751
See application file for complete search history.

(56) References Cited

U.S. PATENT DOCUMENTS

| | | | |
|---|---|---|---|
| 10,908,788 B2* | 2/2021 | Ignatyev | G06F 16/2228 |
| 11,048,531 B1* | 6/2021 | Qiao | G06F 40/186 |
| 2018/0075008 A1* | 3/2018 | Ganta | H04L 51/04 |
| 2019/0155804 A1* | 5/2019 | Miller | G06T 11/206 |
| 2020/0050656 A1* | 2/2020 | Wardlaw | G06F 16/93 |
| 2020/0279020 A1* | 9/2020 | Bar-on | G06F 40/30 |
| 2020/0359210 A1* | 11/2020 | Akkad | G06F 40/226 |
| 2021/0042662 A1* | 2/2021 | Pu | G06N 20/00 |

* cited by examiner

*Primary Examiner* — William D Titcomb

(57) ABSTRACT

A computing device includes a display, and a processor coupled to the display. The processor is configured to monitor user input for a template keyword that matches with one or more templates, and display on the display one or more application service options in response to the template keyword matching the one or more of the templates. Each application service option corresponds to an action that can be performed. The processor provides template content data to a server, with the template content data defining the action corresponding to the template associated with the application service option selected by a user of the computing device.

20 Claims, 14 Drawing Sheets

| Action | Target | Format |
|---|---|---|
| Schedule | GoToMeeting | Event $1, time $2, attendees $3 |
| Schedule | Outlook meeting | Event $1, time $2, location $3, time $4 |
| Schedule | Zoom meeting | Event $1, time $4, attendees $2 |
| Create | Story in JIRA | Summary $1, assignee $2, component $3, description $4 |
| Create | Bug in JIRA | Summary $1, assignee $2, component $3, affected version $4, security $5 |

FIG. 13

UNIFIED INTELLIGENT EDITOR TO CONSOLIDATE ACTIONS IN A WORKSPACE

RELATED APPLICATIONS

This application is a continuation of Ser. No. 17/114,609 filed Dec. 8, 2020 which is a continuation of PCT application serial no. PCT/CN2020/126335 filed Nov. 4, 2020, which is hereby incorporated herein in its entirety by reference.

TECHNICAL FIELD

The present disclosure relates to computing systems, and more particularly, to a computing system with an editor that consolidates actions to be performed by various application services in support of team members collaborating on a project.

BACKGROUND

Enterprises and organizations have employees that often times work together in teams. Team collaboration is a communication and project management approach that emphasizes teamwork, innovative thinking and equal participation to achieve objectives. Goals of team collaboration include completing projects quickly and efficiently, and collectively brainstorming solutions.

A team leader is chosen to foster open lines of communication and facilitate team meetings and tasks. During team meetings, many topics are typically discussed resulting in action items and tasks being assigned to the various team members. To have a successful team meeting, the team leader needs to take accurate meeting notes.

Based on the complexity of the project and the diversity of the team, the amount of time it takes to wrap up a team meeting can be lengthy. At the end of the team meeting, the team leader reviews the meeting notes to summarize what actions need to be performed prior to the next meeting. Oftentimes actions to be performed may be missed in the meeting notes, resulting in a delay of the team meeting its goals and objectives.

SUMMARY

A computing device includes a display, and a processor coupled to the display. The processor is configured to monitor user input for a template keyword that matches with one or more templates, and display on the display one or more application service options in response to the template keyword matching the one or more of the templates. Each application service option corresponds to an action that can be performed. The processor provides template content data to a server, with the template content data defining the action corresponding to the template associated with the application service option selected by a user of the computing device.

The processor may be further configured to display on the display a user interface for the template associated with the application service option selected by the user, and receive the template content data via the user interface to define the action corresponding to the template associated with the application service option selected by the user.

The server may be configured to analyze the template content data and the one or more templates to determine the application service action to be performed.

The computing device may further include an editor configured to be executed by the processor, with the processor being further configured to cache the templates from the server in response to the editor being opened. The processor may also be further configured to provide the template content data to the server after the user exits the editor.

The processor may be configured to repeat the monitor, display, and provide steps so that a plurality of template content data is provided to the server.

The computing device may further include a memory configured to store a list of template keywords, and wherein the processor may be configured to compare the template keyword input by the user with the list of template keywords for a match, with each match corresponding to one or more of the templates.

Each template may include an action field corresponding to one of the template keywords, a target field corresponding to the application service to perform the action, and a format field corresponding to variables needed by the application service to perform the action.

The processor may be configured to save the template content data as a meeting note. The meeting note may be editable by the user before the templated content data is provided to the server. The processor may be configured to transmit the meeting note to other computing devices.

Another aspect is directed to a method for operating the computing device as described above. The method includes monitoring user input for a template keyword that matches with one or more templates, and displaying one or more application service options in response to the template keyword matching the one or more of the templates. Each application service option may correspond to an action that can be performed. The method further includes providing template content data to a server, with the template content data defining the action corresponding to the template associated with the application service option selected by a user of the computing device.

Yet another aspect is directed to a server that includes a memory configured to store a plurality of templates, with each template being associated with an action to be performed by an application service associated with that template. A processor is coupled to the memory to receive template content date from a computing device, with the template content data defining the action corresponding to the template associated with the application service selected by a user of the computing device. The processor may analyze the template content to match the template content data with one of the stored templates, determine the action to be performed based on the matched template, and instruct the application service to perform the determined action to be performed.

BRIEF DESCRIPTION OF THE DRAWINGS

FIG. 13 is a table providing example template rules to be used by the editor illustrated in FIG. 6.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
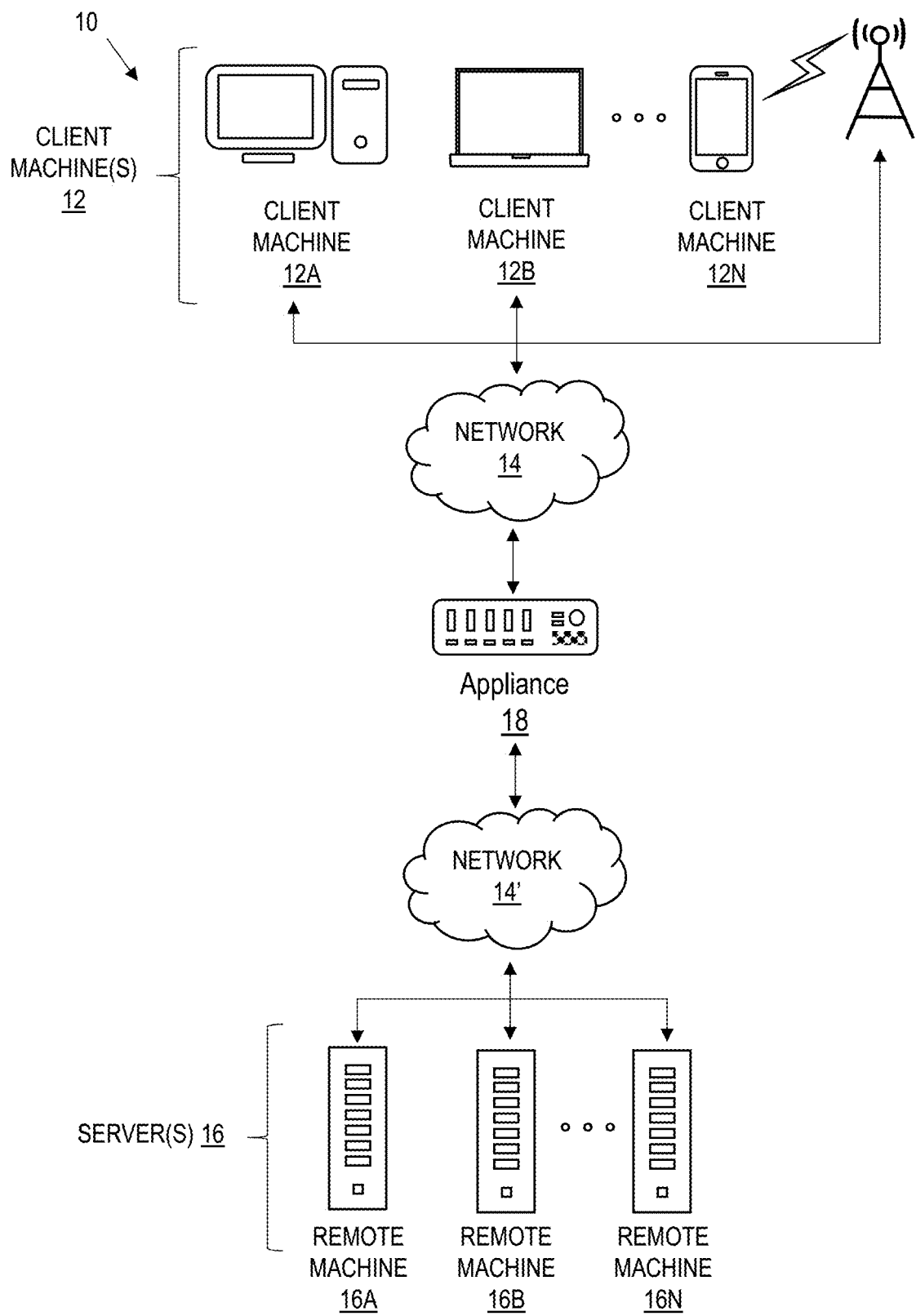
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
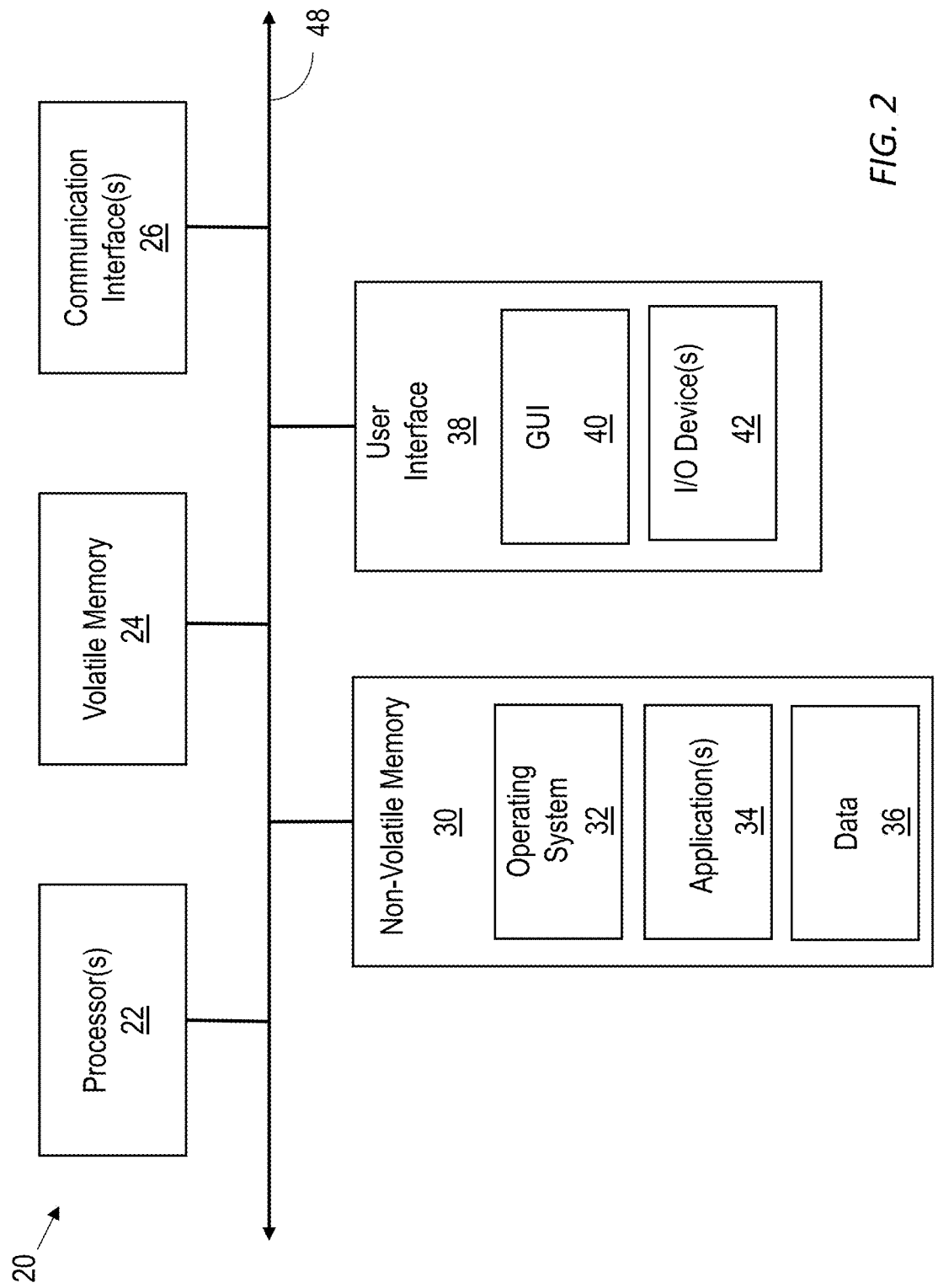
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
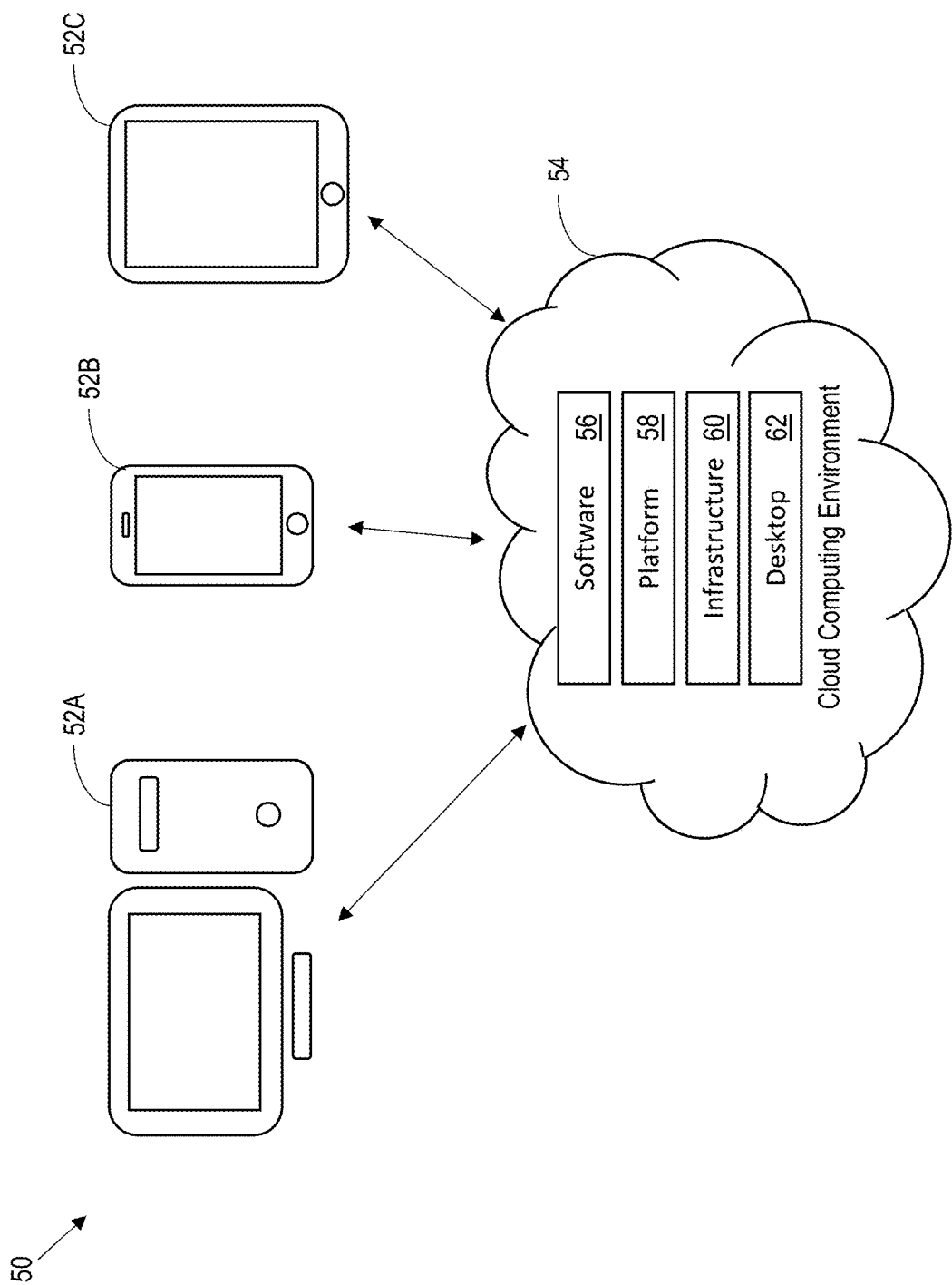
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
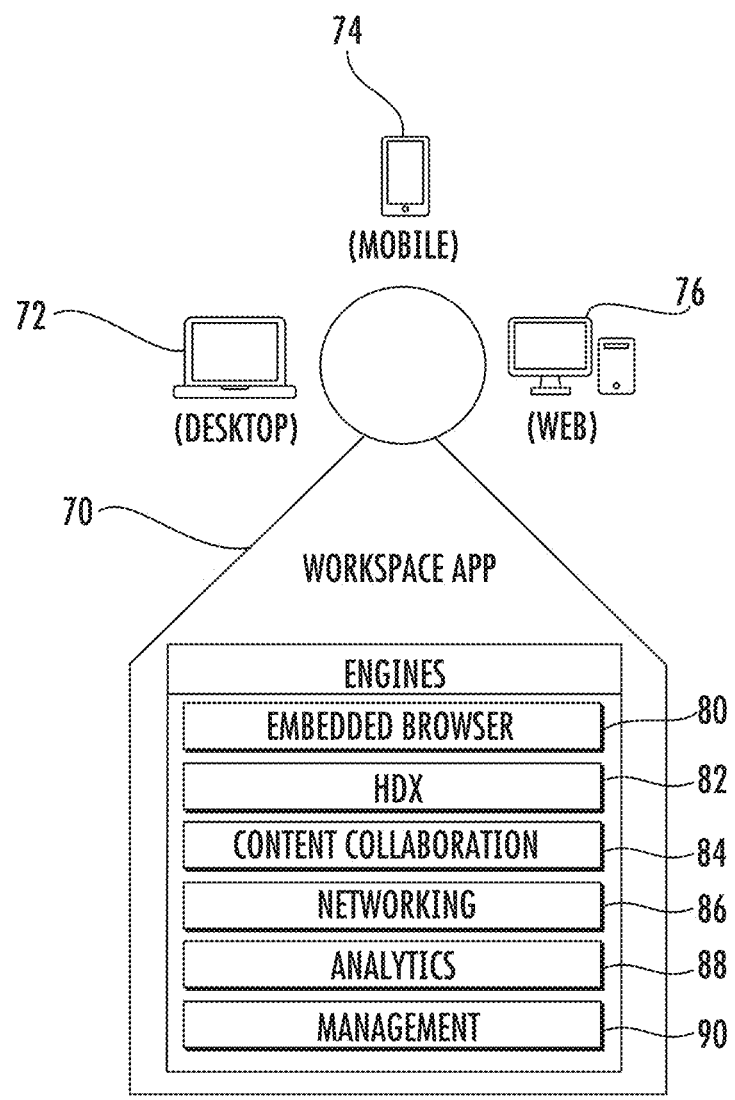
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
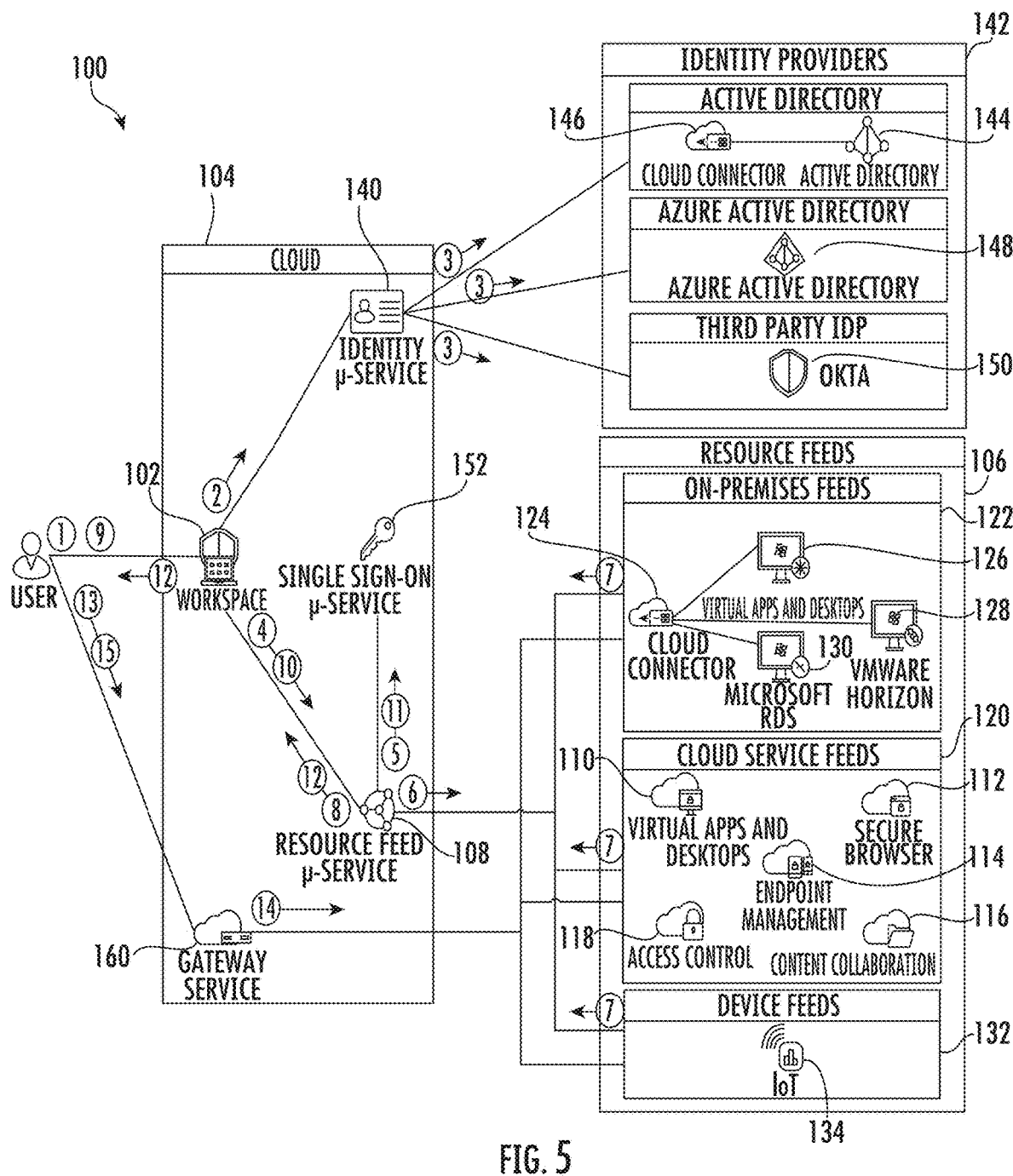
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
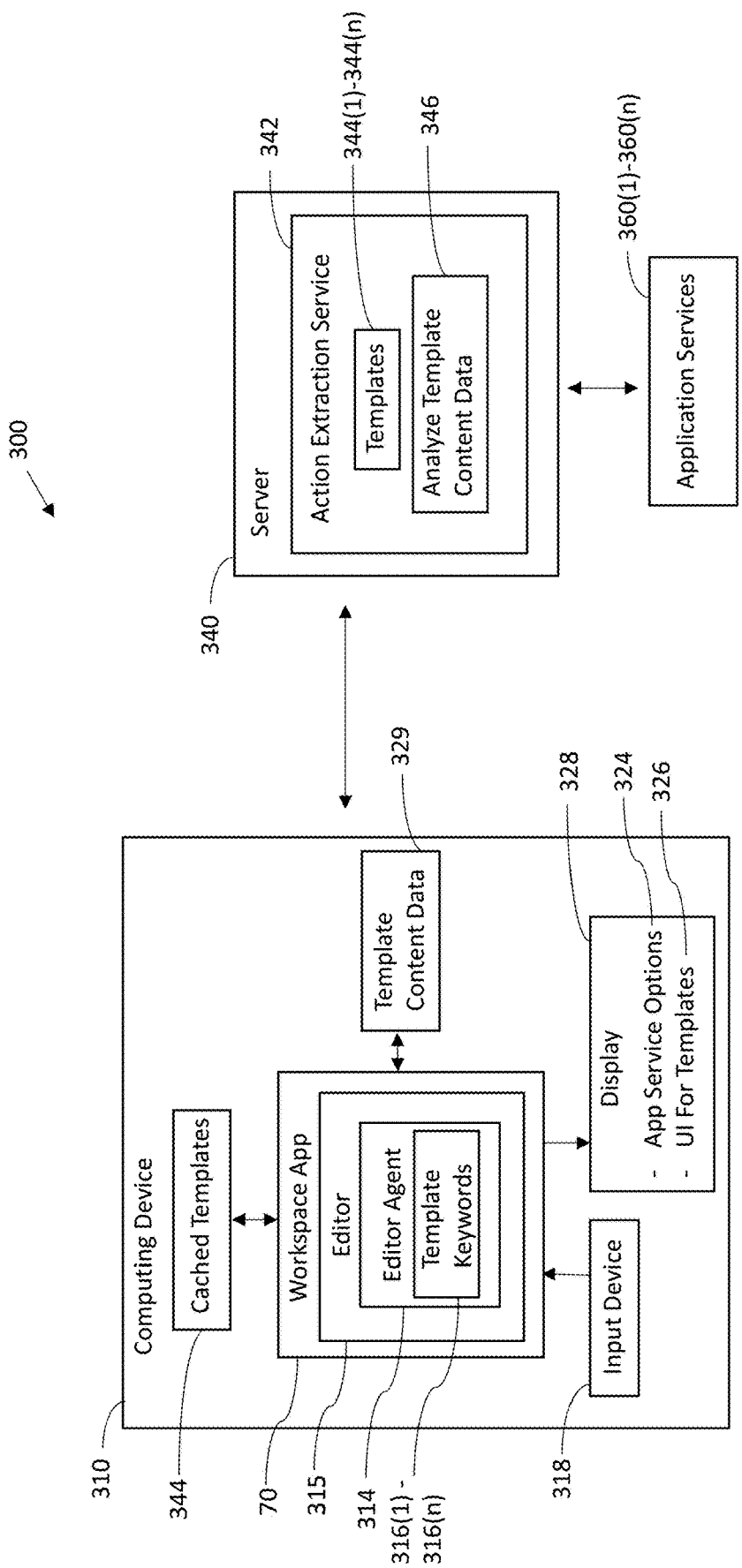
FIG. 6 is a schematic block diagram of a computer system with an editor that consolidates actions to be performed by different application services in which various aspects of the disclosure may be implemented.
Figure 7:
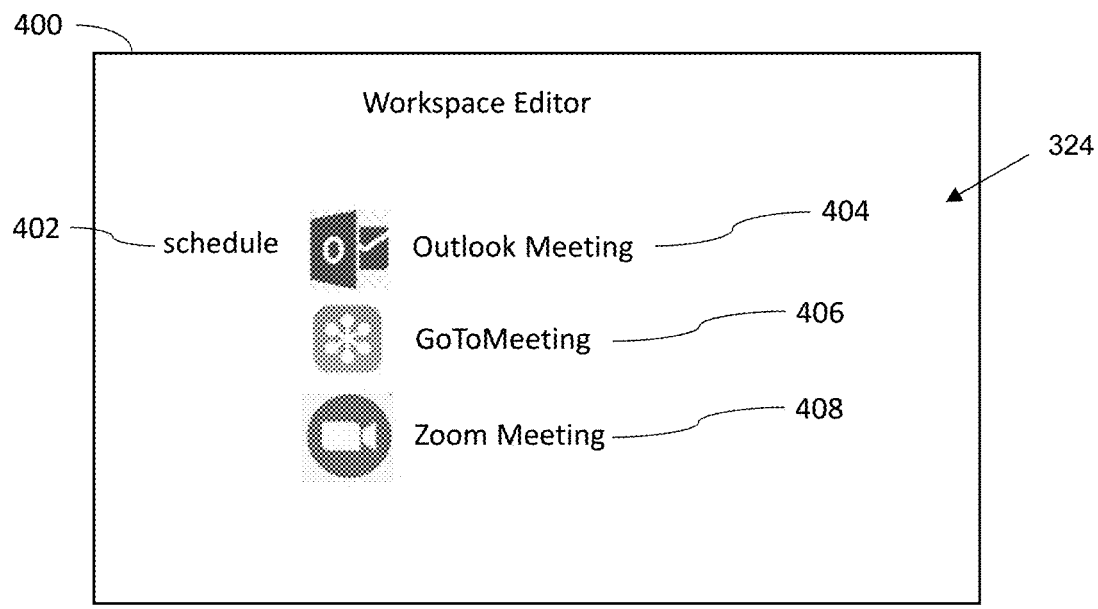
FIGS. 7-11 are example screenshots illustrating operation of the editor illustrated in FIG. 6.

Referring now to FIG. 6, a computer system 300 according to the present disclosure is now described. The computer system 300 illustratively includes a computing device 310, a server 340 and application services 360(1)-360(n). Even though only one computing device 310 is illustrated, the computer system 300 typically includes a plurality of computing devices 310, each of which is in communications with the server 340. The application services 360(1)-360(n) include different applications that be may be used to perform various actions in support of team members collaborating on a project. The application services 360(1)-360(n) may be generally referred to as application services 360.

Meeting notes are taken during a team meeting. An editor 315 is used to record the meeting notes. The meeting notes are to reflect the actions that need to be performed by the team.

Currently, the scheduling of these actions is a manual process that is performed after the team meeting. To schedule a future meeting, for example, a user of the computing device 310 would initiate selection of the appropriate application service 360, such as GoToMeeting, Outlook or Zoom. If this scheduling was performed during the team meeting, this would undesirably lengthen the meeting time, particularly when there may be a large number of actions to schedule. Oftentimes an item to be scheduled may be overlooked when performed at the end of the meeting.

As will be described in greater detail below, the editor 315 includes an editor agent 314. The editor agent 314 advantageously consolidates all of the desired actions to be performed by the application services 360 while a user of the computing device 310 is taking the meeting notes via the editor 315.

The editor agent 314 uses templates 344(1)-344(n) to identify the actions to be performed based on template keywords 316(1)-316(n) entered by the user. The templates 344(1)-344(n) may be generally referred to as templates 344, and the template keywords 316(1)-316(n) may be generally referred to as template keywords 316. The editor agent 314 is in communications with an action extraction service 342 within the server 340.

After the user exits the editor 315, the editor agent 314 is configured to provide template content data 329, as entered by a user in the templates 344, to the action extraction service 342. The action extraction service 342 analyzes the template content data 329 and the templates 344 to determine the actions to be performed by the application services 360.

After this determination is made, the action extraction service 342 automatically instructs the appropriate application services 360. These instructions are provided to the application services 360 by the action extraction service 342 without requiring any input by the user. The action extraction service 342 selects or opens the appropriate application services 360, and provides the instructions for the actions to be performed as reflected in the meeting notes.

The editor 315 may be referred to as a unified intelligent editor since the application service options 324 to be performed are consolidated in the user's workspace. This advantageously provides a unified experience to the user in which all of the backend actions are aggregated. The user is able to organize the meeting notes within one place without having to leave the editor 315.

A flexible presentation is also provided for operation of the editor 315. In response to the user requesting a specific action while in the editor 315, user interface 326 will be presented to the user to define that action. After the action has been defined via the user interface 326, text content will be presented. The text content serves as part of the meeting notes. The editor 315 also supports defining customized templates to maintain mapping relations between text and user interface, and also between text and backend actions.

The server 340 may be cloud-based or on on-premises. The action extraction service 342 within the server 340 stores the templates 344. This allows updates to be made to the templates 344 in one location as compared to updating the templates 344 stored on individual computing devices 310. Each template 344 is associated with a particular action to be performed by one of the application services 360 associated with that template.

The computing device 310 is configured to execute the workspace app 70. As discussed above, the workspace app 70 is how a user of the computing device 310 gets access to their workspace resources, one category of which is application services 360. These applications 360 can be SaaS apps, web apps or virtual apps.

The editor 315 operates within the workspace app 70. The editor agent 314 is the main logic for providing the editor 315 user and supporting interaction in response to inputs from the user. The editor 315 is opened by the user by selecting, for example, a displayed tab or dropdown menu item. Once the editor 315 is opened, the editor agent 314 communicates with the action extraction service 342 to receive the templates 344. The received templates 344 are cached within the computing device 310.

The editor agent 314 monitors user input via an input device 318 for a template keyword 316 that matches with one or more of the templates 344. A list of template keywords 316 is kept by the editor agent 314. A template keyword 316 may be an action word, such as "schedule", for example. In this case, the template 344 would correspond to the action of scheduling a meeting via one of the application services 360.

One or more application service options 324 are displayed in response to the template keyword 316 matching one or more of the templates 344. Each application service option 324 corresponds to a specific application service 360 that may be used for scheduling the meeting. In response to the user selecting one of the application service options 324, a user interface 326 for the template 344 associated with the application service option 324 selected by the user is displayed on a display 328.

Template content data 329 is received via the user interface 326 to define the action corresponding to the template 344 associated with the application service option 324 selected by the user. The template content data 329, for example, defines the event, time and attendees for the meeting that is to be scheduled by the application service 360 associated with the template 344. The editor agent 314 saves this information as formatted text.

After the user exits the editor 315, the editor agent 314 provides the template content data 329 or formatted text to the action extraction service 342. The action extraction service 342 will then go through each of the templates 344 in order to match the received template content data 329 with one of the templates 344. In response to matching the template content data 329 with one of the templates 344, the action extraction service 342 determines the application service action to be performed.

The editor agent 314 is configured to save more than one template content data 329 while the user is taking meeting notes within the editor 315. This advantageously allows the desired actions as recorded in the meeting notes to be consolidated. The action extraction service 342 later determines each of the application service actions to be performed in response to matching each of the received template content data 329 with one of the templates 344.

After each of the application service actions has been determined by the action extraction service 342, the action extraction service 342 instructs the respective application services 360 to perform the desired actions as defined in the received template content data 329. The action extraction service 342 automatically instructs the respective application services 360 without requiring any additional user input. The user of the computing device 310 does not need to select or open any of the application services 360 after exiting the editor 315 in order to instruct the application services 360.

Example screenshots illustrating operation of the editor 315 will now be discussed in reference to FIGS. 7-11. As noted above, the editor agent 314 holds the main logic for providing the editor 315 in the workspace. The editor agent 314 provides the editor 315 user and supporting interaction in response to inputs from the user.

When the user is operating in the editor 315, the templates 344 are maintained at the server 340, which may also be referred to as the backend. In response to the user taking notes in the editor 315, the editor agent 314 will monitor if the word input by the user is a template keyword 316.

The editor agent 314 is triggered to treat the word entered by the user as a potential template keyword 316 when the user immediately presses a predetermined key on the input device 318 after input of the potential template keyword 316. The predetermined key to be pressed immediately after entering the potential template keyword 316 may be the tab key, for example. The editor agent 314 is not limited to being triggered by the tab key as other keys may be used to perform the triggering immediately after the potential template keyword 316 is entered.

In this example, the template keyword 316 is entered as "schedule" and the tab key is pressed immediately after it. In response to "schedule" matching one of the template keywords 316, the editor agent 314 will track this event and provide potential actions supported in the backend, as illustrated by screen shot 400 in FIG. 7.

In screen shot 400, the template keyword 316 "schedule" is displayed in field 402. The potential actions supported in the backend are referred to as application service options 324. The application service options 324 associated with the template keyword 316 are automatically provided in fields 404, 406 and 408. Field 404 corresponds to an Outlook meeting which is a Microsoft Corp. product, field 406 corresponds to a GoToMeeting which is a Citrix Systems product, and field 408 corresponds to a Zoom meeting which is a Zoom Video Communications product.

Figure 8:
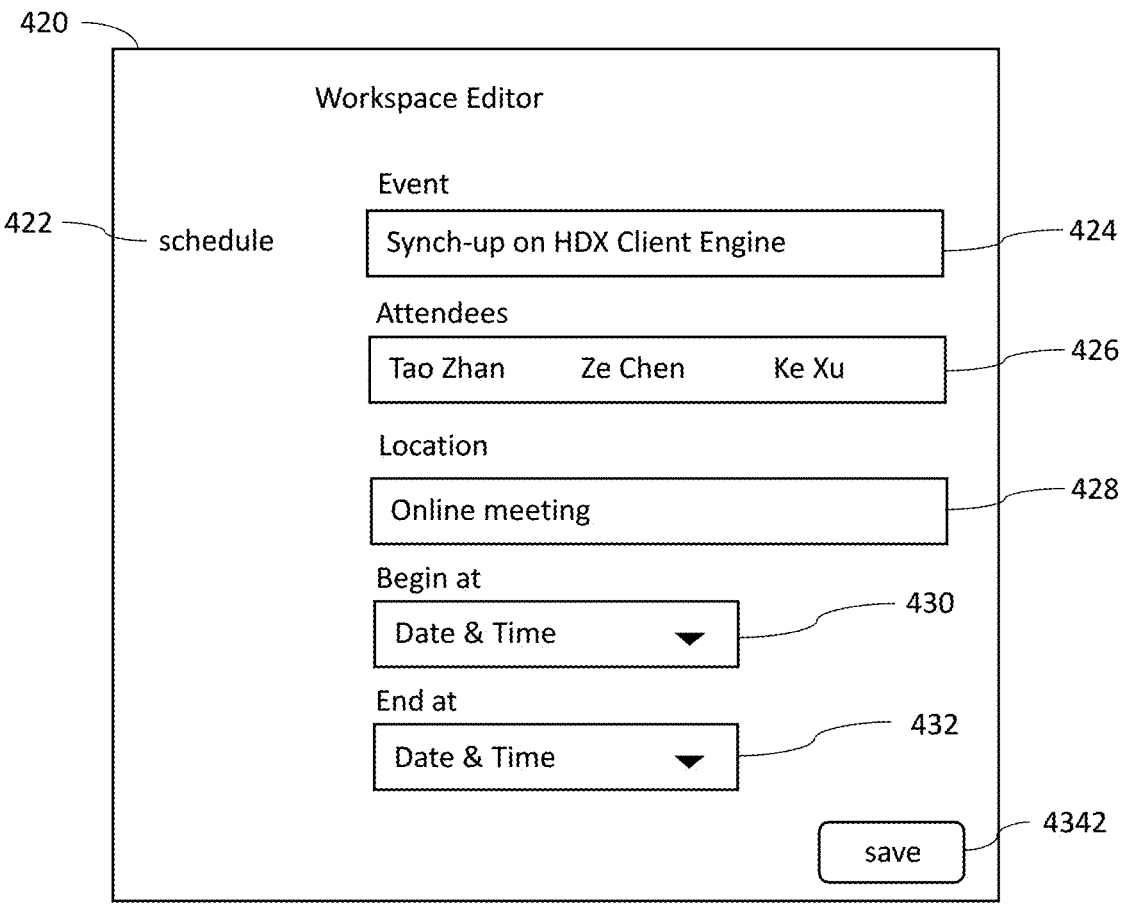
Figure 9:
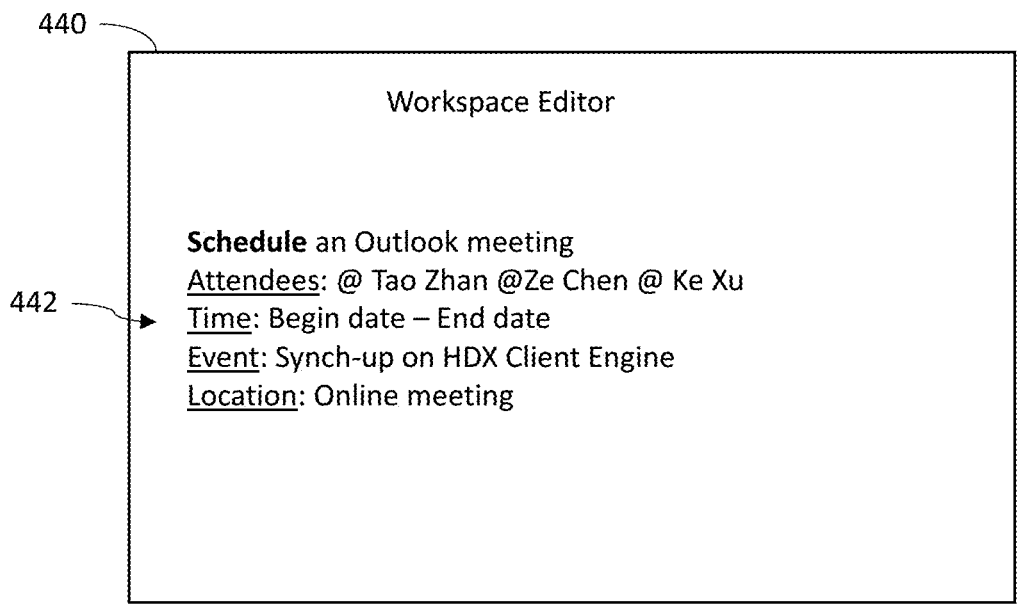

In response to the user choosing one of the displayed application service options 324, the editor agent 314 will bring up the user interface (UI) for that action, as illustrated by screen shot 420 in FIG. 8. The template keyword 316 "schedule" is displayed in field 422. In this example, the application service option 324 selected by the user is Outlook meeting.

The user enters template content data to define the action corresponding to the template associated with the Outlook meeting application service 360 as selected by the user. The template content data 329 is to be received in fields 424-432. Field 424 corresponds to a title of the meeting or event, field 426 corresponds to attendees for the event, and field 428 corresponds to a location of the event, which in this case is an online meeting. The begin date and time of the online meeting is in field 430, and the end date and time of the online meeting is in field 432.

After the template content data 329 has been entered in fields 424-432, the user saves the displayed page by selecting the save button 434. The editor agent 314 then translates the template content data 329 into a formatted text structure 442 as illustrated by screen shot 440 in FIG. 9. The formatted text structure 442 provides the specifics of the Outlook meeting that is to be scheduled. The formatted text structure 442 may also be used directly as meeting notes, and may be forwarded via email to other team members. The meeting notes received by the other team members may be opened in the editor 315 on their respective computing devices 310. This allows the other team members to add to or modify the meeting notes while in communications with the action extraction service 342.

Figure 10:
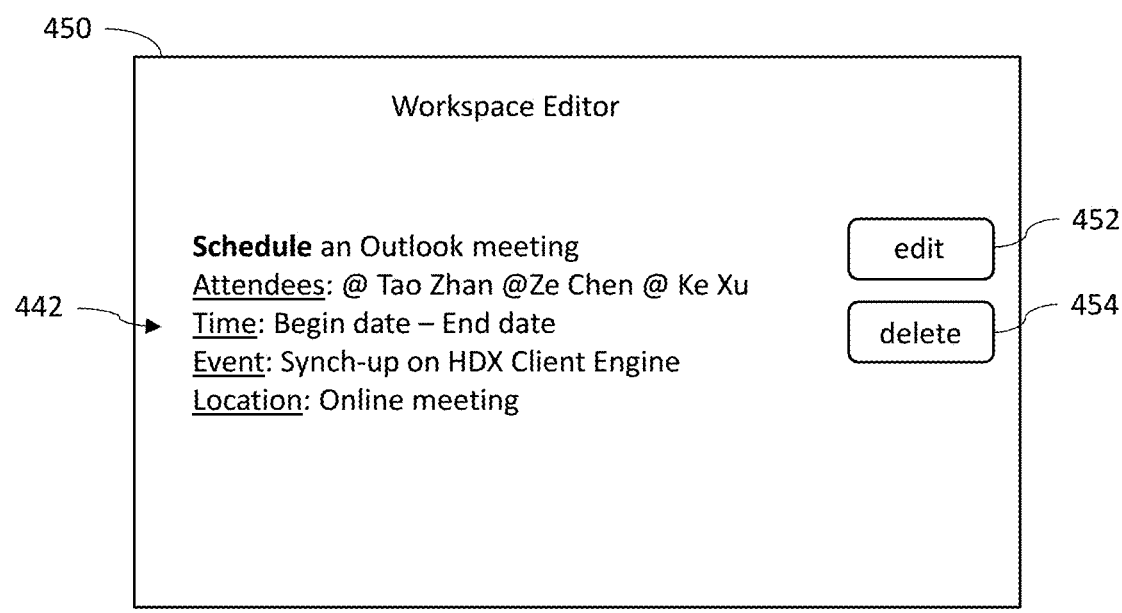
Figure 11:
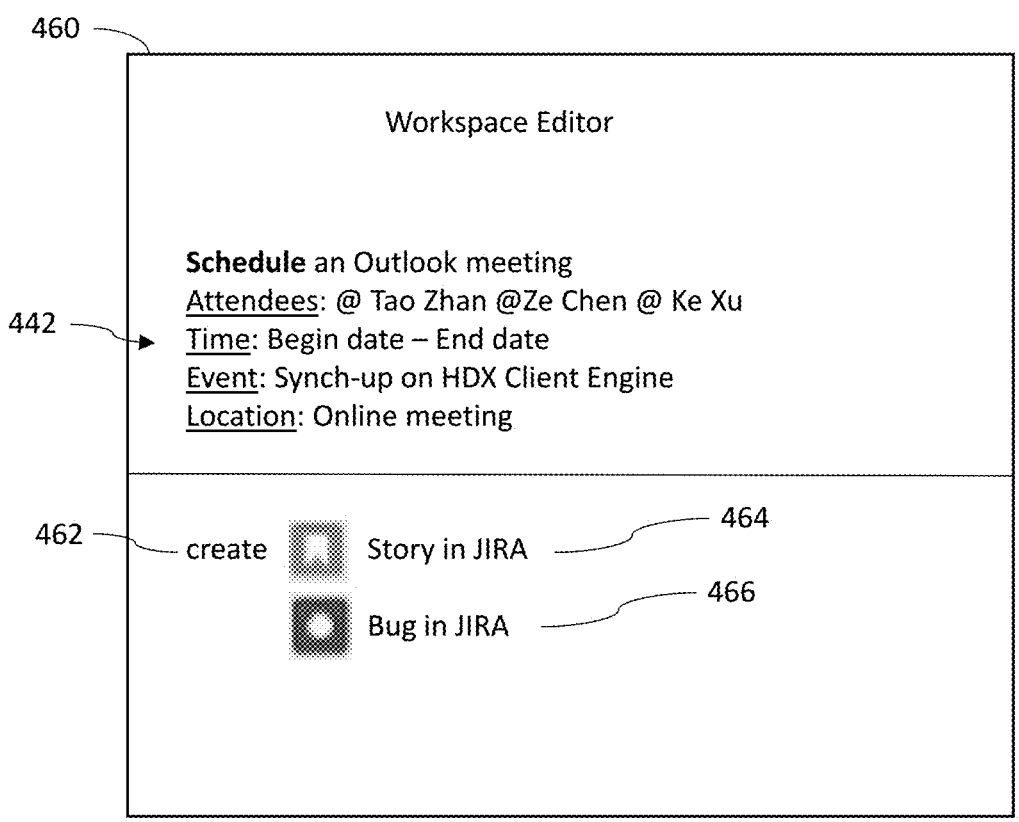

The user has the option to edit or delete the formatted text structure 442 by double clicking anywhere on the displayed formatted text structure 442 in screen shot 440. In response to the user double clicking on the displayed formatted text structure 442, screen shot 450 is displayed as illustrated in FIG. 10.

The user can edit the scheduled Outlook meeting by selecting the edit button 452. In response to the user selecting the edit button 452, this will cause screen shot 420 to re-appear so that the user can perform the desired edits. Alternatively, the scheduled Outlook meeting may be deleted by the user selecting the delete button 454.

The editor agent 314 is not limited to a user entering a single action to be performed in the backend. As an example, another action may be added by the user as illustrated by screen shot 460 in FIG. 11. The screen shot 460 includes the formatted text structure 442 from screen shot 440. In this example, the template keyword 316 is entered as "create" and the tab key is pressed immediately after it.

In screen shot 460, the template keyword 316 "create" is displayed in field 462. In response to "create" matching one of the template keywords 316, the editor agent 314 will display the corresponding application server options 324. In this example, the user is to create a new JIRA ticket. JIRA is provided by Atlassian and is used for bug tracking, issue tracking, and project management. A ticket in JIRA, or any other service desk platform, is an event that must be investigated or a work item that must be addressed.

The user has the option to create a story in JIRA by selecting field 464 or create a bug in JIRA by selecting field 466. In response to the field selected by the user, the editor agent 314 will bring up the user interface (UI) for that action. Although not illustrated, the user interface for create a story in JIRA includes fields for the user to provide a summary, an assignee, a component and a description. Similarly, the user interface for create a bug in JIRA includes fields for the user to provide a summary, an assignee, a component, and an affected version and security.

After the template content data 329 has been entered in the appropriate fields, the user saves the input by selecting a save button. As with scheduling an Outlook meeting as described above, the editor agent 314 translates the template content data 329 into a formatted text structure similar to the formatted text structure 442 as provided in screen shot 440 in FIG. 9. The formatted text structure in this case provides the specifics of the JIRA ticket to be created. As with scheduling an Outlook meeting, the user also has the option to edit or delete the formatted text structure. The editor 315 keeps track of all the saved formatted text structures, which are used as meeting notes.

After the user exits the editor 315, the template content data 329 for each of the user defined actions is provided to the backend. The action extraction service 342 in the backend will then request the appropriate SaaS application service to do the real actions, such as scheduling the meeting in outlook and creating a JIRA ticket.

Figure 12:
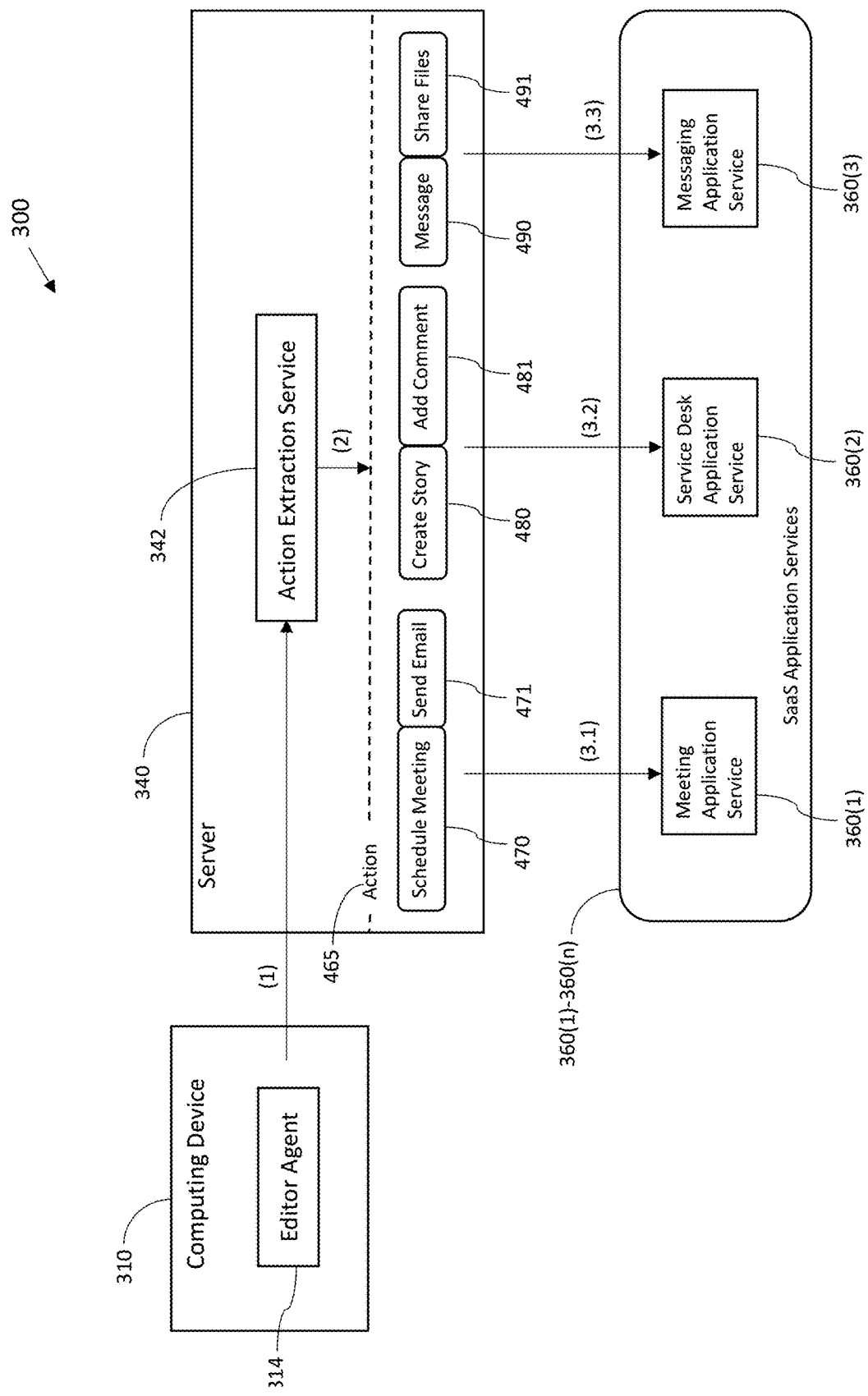
FIG. 12 is a high level schematic block diagram of the computer system illustrated in FIG. 6.

A high level design of the computing system 300 illustrating the major units for providing a functioning editor 315 is provided in FIG. 12. The main units, as discussed above, are the editor agent 314 and the action extraction service 342.

The sequence of events is for the editor agent 314 to provide at line (1) template content data 329 to the action extraction service 342 after the user exits the editor 315. The action extraction service 342 then determines at line (2) the actions to be performed in the backend. The consolidated actions in the backend are in section 465.

The action extraction service 342 is configured to instruct the corresponding application services after determining the application service actions to be performed. This instructing is performed without requiring user input from the user of the computing device 310. The action extraction service 342 selects or opens the appropriate application services 360, and provides the instructions for the actions to be performed as reflected in the meeting notes.

Example actions provided in the backend of the server 340 include schedule a meeting 470 at line (3.1), create a story 480 at line (3.2), and generate a message 490 at line (3.3). To schedule the meeting, the backend sends an email 471 via a SaaS meeting application service 360(1) such as Outlook meeting. To create the story, the backend adds a comment 481 via a SaaS service desk application service 360(2) such as JIRA. To generate the message, the backend shares a file 491 via a SaaS messaging application service 360(3). The action extraction service 342 receives confirmation from the respective application services 360(1)-360(3) that the requested application service actions have been performed.

Referring now to FIG. 13, formatting rules of the templates 344 will be discussed. The editor agent 314 can provide many templates 344 which are integrated with related actions in the backend. A template is to follow the below rules:

<action>{target . . . } {format}

Action is the trigger word for a specific template 344. Target is the application service 360 corresponding to the action. Action and target can also be combined to be referred to as an option for association. Format is for the configure values that the template 344 supports, as illustrated in FIG. 8.

A list of supported template keywords or action words 316 is to be maintained as well as the target in the backend with a data structure as provided by table 500 in FIG. 13. As an extend scenario, the template 344 may also be enriched to provide a more robust syntax (similar to markdown) to serve more complex use cases in the editor 315.

Table 500 includes three columns. Column 510 corresponds to the actions to be performed by the backend. The illustrated actions are "schedule" 512 and "create" 514. Column 520 corresponds to the target application services 360 to perform the actions in column 510. Three application service options 324 are available for the "schedule" template keyword 316, and two application service options 324 are available for the "create" template keyword 316. Column 530 corresponds to the format of the respective templates 344. The $ signs in the format indicate variables that are to be input by the user when a particular target is selected.

The action extraction service 342 is to go through every template 344 to check if any of the templates 344 match the template content data 329 from the edit agent 314. If there is a match, the action extraction service 342 will continue to use format data to extract every value corresponding to the template content data 329.

Figure 14:
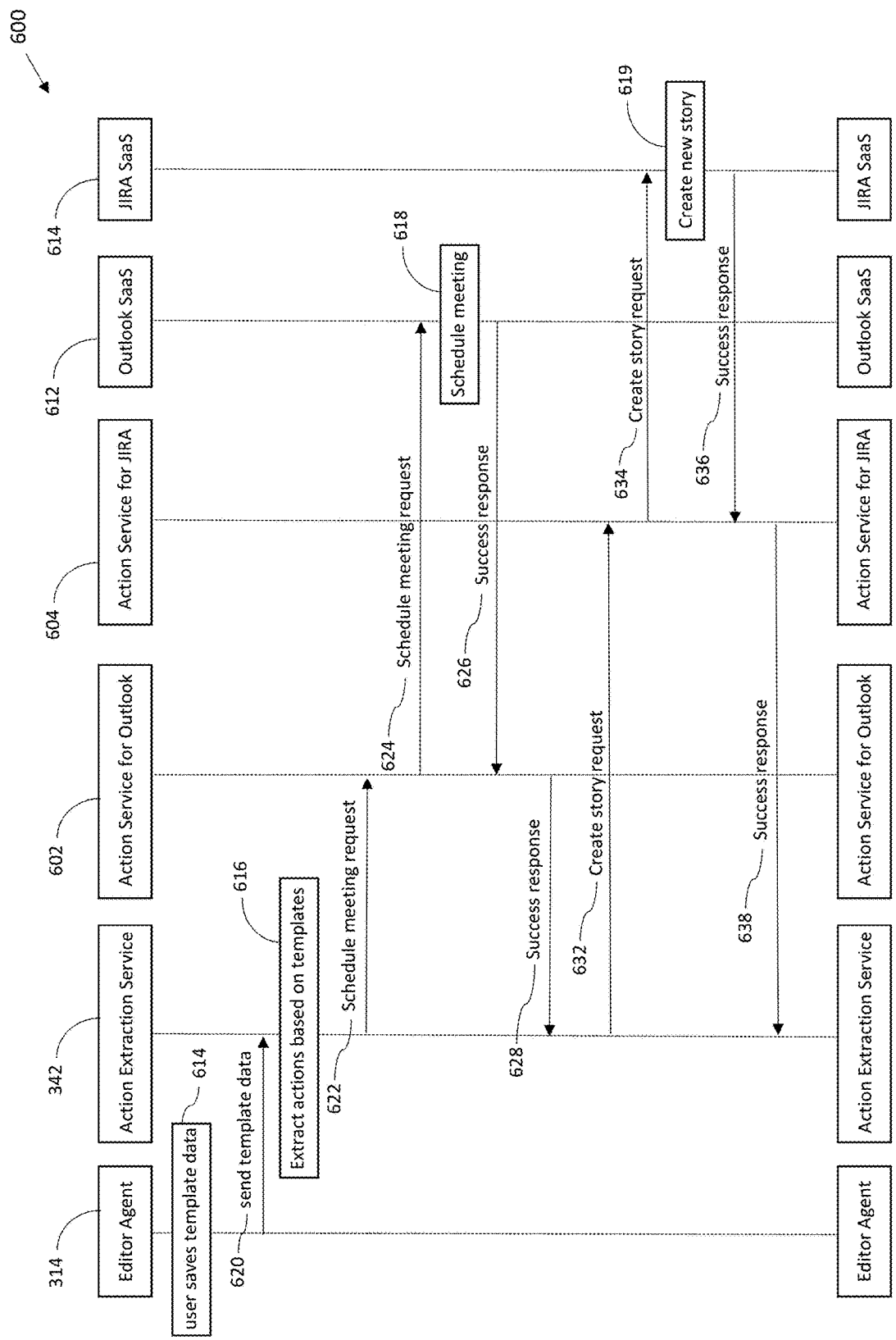
FIG. 14 is a data process flow diagram for the computer system illustrated in FIG. 6.

A data process flow 600 for the editor 315 will be discussed in reference to the FIG. 14. The editor agent 314 saves the template content data 329 at Block 614 after the user exits the editor 315. The editor agent 314 sends the template content data 329 to the action extraction service 342 at line 620.

The action extraction service 342 extracts all actions using the templates 344 and the template content data 329 at Block 616. In this example two requests were extracted. A first request is for the action extraction service 342 to send a schedule meeting request at line 622 to the action service for Outlook 602. The action service for Outlook 602 forwards the schedule meeting request at line 624 to the Outlook SaaS 612. The Outlook SaaS 612 operates accordingly to schedule the meeting at Block 618. The Outlook SaaS 612 then sends a success response at line 626 back to the action service for Outlook 602. The action service for Outlook 602 forwards the success response at line 628 to the action extraction service 342.

A second request is for the action extraction service 342 to send a create story request at line 632 to the action service for JIRA 604. The action service for JIRA 604 forwards the create story request to the JIRA SaaS 614 at line 634. The JIRA SaaS 614 operates accordingly to create a new story at Block 619. The JIRA SaaS 614 then sends a success response back to the action service for JIRA 604 at line 636.

The action service for JIRA 604 then forwards the success response at line 638 to the action extraction service 342.

Figure 15:
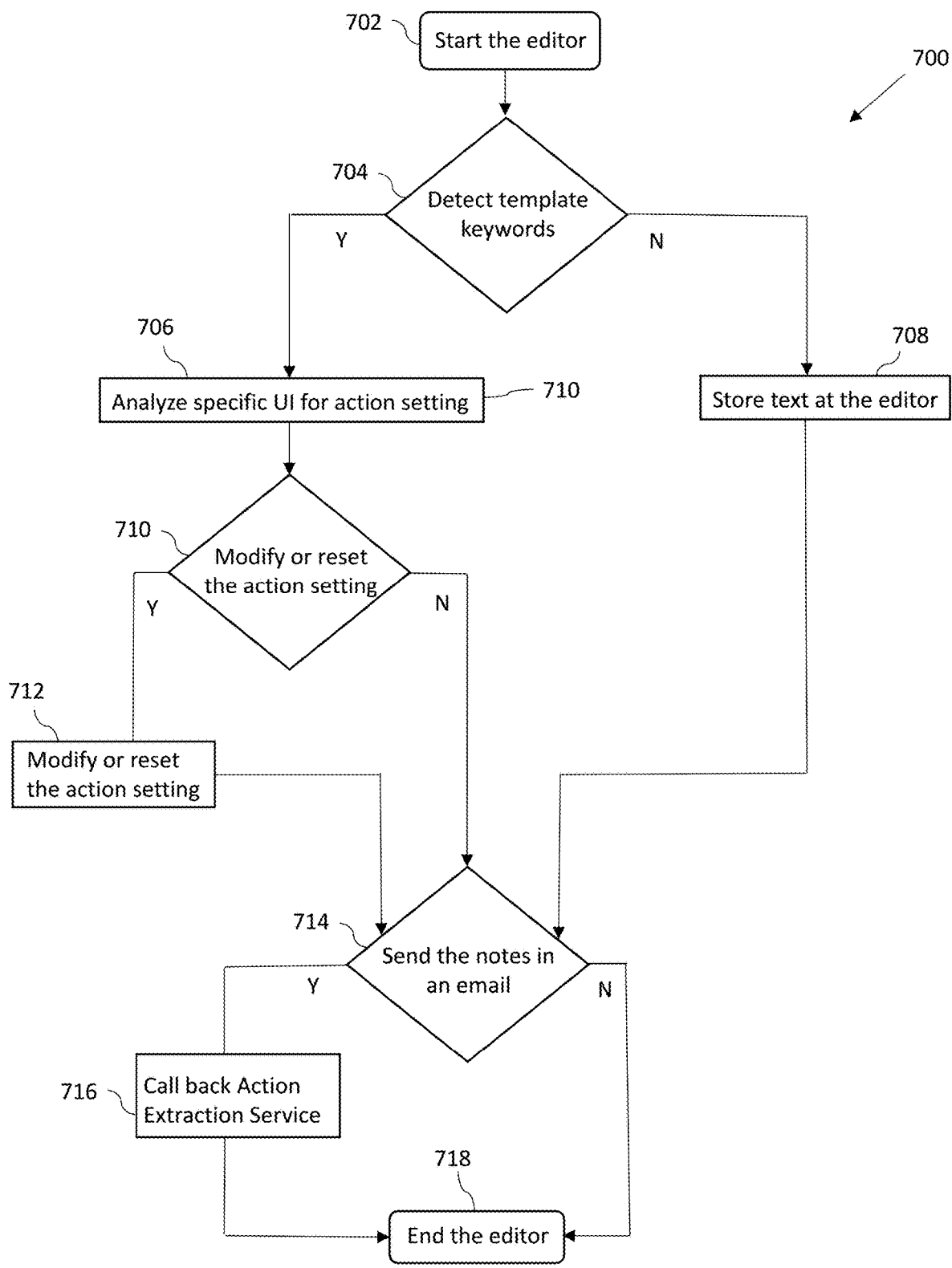
FIG. 15 is a flowchart illustrating a method for editing meeting notes generated by the editor illustrated in FIG. 6.

A flow chart 700 illustrating user edits to meeting notes using the editor 315 will be discussed in reference to FIG. 15. The editor 315 starts in Block 702. At Block 704 a decision is made on if the editor agent 314 detected template keywords 316 being entered by the user.

If the editor agent 314 does not detect a template keyword 316 followed by a tab key, the meeting notes will be saved at the editor 315 at Block 708. If the editor agent 314 detects a template keyword 316 followed by the tab key, a related application window will pop up at Block 706 according to the template keyword 316. The user interface defining the action to be performed will be displayed.

At Block 710, the user has the option to modify or reset the action setting, which is part of the meeting notes. The user can modify or reset the action setting even if the action setting has been written down as text. If the user chooses to modify or reset the action setting, then the action is modified at Block 712. At Block 714, the user can decide if the meeting notes are to be sent in an email. This Block 714 receives input from Block 712, Block 710 and Block 708. The user can decide to send the meeting notes to others as an email or just copy the notes for other purpose. If the user decides to send the email, the application extraction service 342 will call back the related SaaS application service 360 and send the notes as an email. This completes or ends the editor 315 at Block 718. If the user does not choose this option, then the editing is completed at Block 718.

Figure 16:
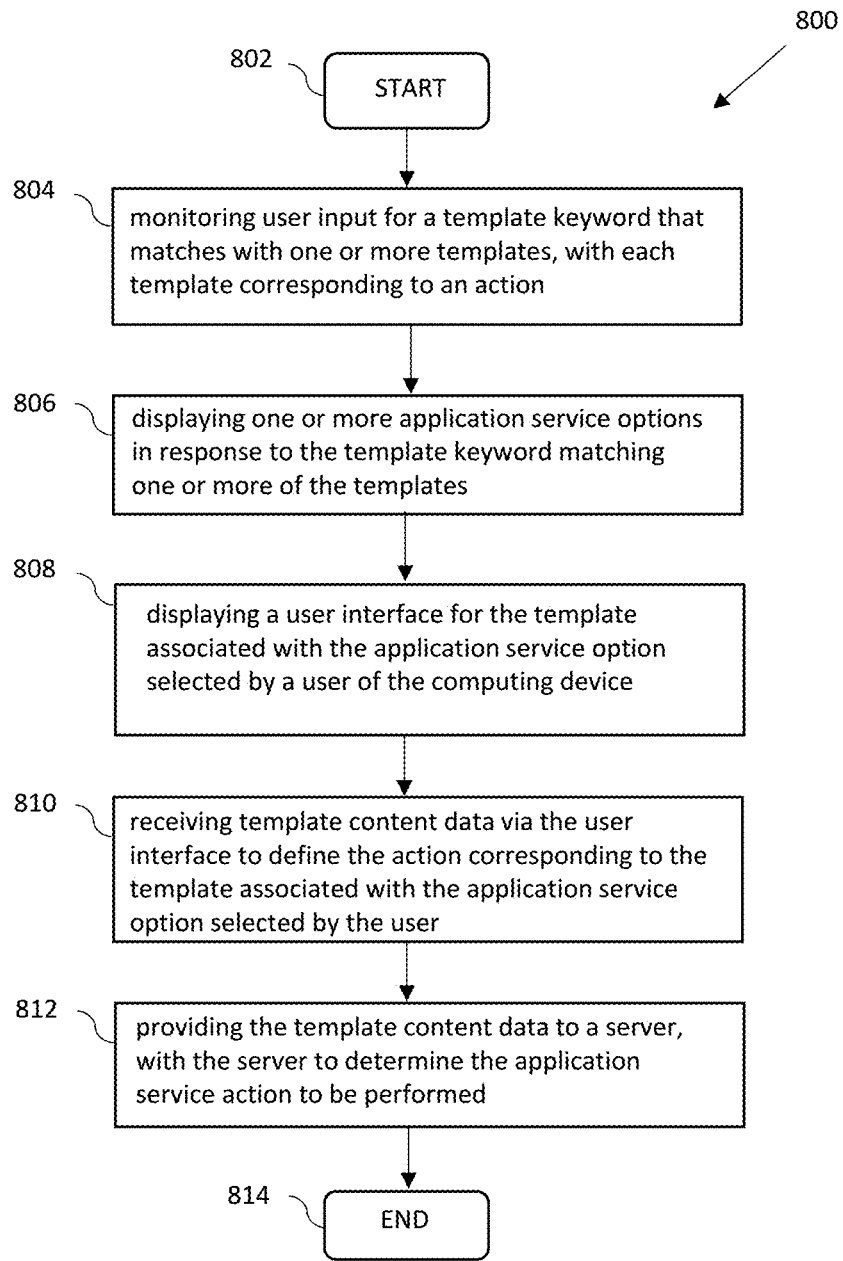
FIG. 16 is a flowchart illustrating a method for operating the editor using the computing device illustrated in FIG. 6.

Referring now to FIG. 16, a flowchart 800 illustrating a method for operating the computing device 310 will be discussed. From the start (Block 802), the method includes monitoring user input at Block 804 for a template keyword 316 that matches with one or more templates 344. Each template 344 corresponds to an action that can be performed by an application service 360 associated with the template 344.

The method further includes displaying at Block 806 one or more application service options 324 in response to the template keyword 316 matching one or more of the templates 344. A user interface 326 for the template 344 associated with the application service option 324 selected by a user of the computing device 310 is displayed at Block 808.

Template content data 329 is received at Block 810 via the user interface 326 to define the action corresponding to the template 344 associated with the application service option 324 selected by the user. The template content data 329 is provided to a server 340 at Block 812. The server 340 is to analyze the template content data 329 and the templates 344 to determine the application service action 324 to be performed. The method ends at Block 814.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be That which is claimed:

1. A computing device comprising:
a display; and
a processor coupled to said display and configured to perform the following:
monitor user input for a template keyword that matches with one or more templates,
display on said display one or more application service options in response to the template keyword matching the one or more of the templates, with each application service option corresponding to an action that can be performed, and
provide template content data to a server, with the template content data defining the action corresponding to the template associated with the application service option selected by a user of the computing device.

2. The computing device according to claim 1 wherein said processor is further configured to perform the following:
display on said display a user interface for the template associated with the application service option selected by the user; and
receive the template content data via the user interface to define the action corresponding to the template associated with the application service option selected by the user.

3. The computing device according to claim 1 wherein the server is configured to analyze the template content data and the one or more templates to determine the application service action to be performed.

4. The computing device according to claim 1 further comprising an editor configured to be executed by said processor, with said processor being further configured to cache the templates from the server in response to the editor being opened.

5. The computing device according to claim 4 wherein said processor is further configured to provide the template content data to the server after the user exits the editor.

6. The computing device according to claim 1 wherein said processor is configured to repeat the monitor, display, and provide steps so that a plurality of template content data is provided to the server.

7. The computing device according to claim 1 further comprising a memory configured to store a list of template keywords, and wherein said processor is configured to compare the template keyword input by the user with the list of template keywords for a match, with each match corresponding to one or more of the templates.

8. The computing device according to claim 1 wherein each template comprises the following:
an action field corresponding to one of the template keywords;
a target field corresponding to the application service to perform the action; and
a format field corresponding to variables needed by the application service to perform the action.

9. The computing device according to claim 1 wherein said processor is configured to save the template content data as a meeting note.

10. The computing device according to claim 9 wherein the meeting note is editable by the user before the templated content data is provided to the server.

11. The computing device according to claim 9 wherein said processor is configured to transmit the meeting note to other computing devices.

12. A method comprising:
monitoring user input for a template keyword that matches with one or more templates;
displaying one or more application service options in response to the template keyword matching the one or more of the templates, with each application service option corresponding to an action that can be performed, and
providing template content data to a server, with the template content data defining the action corresponding to the template associated with the application service option selected by a user of the computing device.

13. The method according to claim 12 further comprising:
displaying a user interface for the template associated with the application service option selected by the user; and
receiving the template content data via the user interface to define the action corresponding to the template associated with the application service option selected by the user.

14. The method according to claim 12 wherein the server is configured to analyze the template content data and the one or more templates to determine the application service action to be performed.

15. The method according to claim 12 wherein the monitoring, displaying and providing steps are performed by an editor that is executed by a processor, and further comprising:
caching the templates from the server in response to the editor being opened.

16. The method according to claim 15 wherein the template content data is provided to the server after the user exits the editor.

17. The method according to claim 12 further comprising repeating the monitoring, displaying, and providing steps so that a plurality of template content data is provided to the server.

18. The method according to claim 12 further comprising storing a list of template keywords, and further comprising comparing the template keyword input by the user with the list of template keywords for a match, with each match corresponding to one or more of the templates.

19. The method according to claim 12 wherein each template comprises the following:
an action field corresponding to one of the template keywords;
a target field corresponding to the application service to perform the action; and
a format field corresponding to variables needed by the application service to perform the action.

20. A server comprising:
a memory configured to store a plurality of templates, with each template being associated with an action to be performed by an application service associated with that template; and
a processor coupled to said memory and configured to perform the following:

receive template content date from a computing device, with the template content data defining the action corresponding to the template associated with the application service selected by a user of the computing device, analyze the template content to match the template content data with one of the stored templates, determine the action to be performed based on the matched template, and instruct the application service to perform the determined action to be performed.

* * * * *